(12) United States Patent
Kurkijärvi et al.

(10) Patent No.: US 11,471,817 B2
(45) Date of Patent: Oct. 18, 2022

(54) METHOD FOR PROCESSING PLASTIC WASTE PYROLYSIS GAS

(71) Applicant: Neste Oyj, Espoo (FI)

(72) Inventors: Antti Kurkijärvi, Porvoo (FI); Hannu Lehtinen, Porvoo (FI); Esa Korhonen, Porvoo (FI); Mikko Matilainen, Porvoo (FI); Max Nyström, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 17/596,358

(22) PCT Filed: Jun. 1, 2020

(86) PCT No.: PCT/FI2020/050369
§ 371 (c)(1),
(2) Date: Dec. 8, 2021

(87) PCT Pub. No.: WO2020/249853
PCT Pub. Date: Dec. 17, 2020

(65) Prior Publication Data
US 2022/0226765 A1     Jul. 21, 2022

(30) Foreign Application Priority Data
Jun. 10, 2019 (FI) ...................... 20195493

(51) Int. Cl.
*B01D 53/00* (2006.01)
*C10G 5/06* (2006.01)
*C10B 53/07* (2006.01)
*B01D 5/00* (2006.01)
*C10G 70/06* (2006.01)

(52) U.S. Cl.
CPC ......... *B01D 53/002* (2013.01); *B01D 5/0036* (2013.01); *C10G 5/06* (2013.01); *C10G 70/06* (2013.01); *B01D 2257/70* (2013.01); *B01D 2258/0291* (2013.01); *C10B 53/07* (2013.01)

(58) Field of Classification Search
USPC .......................................................... 95/39
See application file for complete search history.

(56) References Cited

U.S. PATENT DOCUMENTS

| | | |
|---|---|---|
| 3,663,645 A | 5/1972 | Dorn et al. |
| 4,591,366 A | 5/1986 | Wohner et al. |

(Continued)

FOREIGN PATENT DOCUMENTS

| | | |
|---|---|---|
| CN | 1122609 A | 5/1996 |
| CN | 1225663 A | 8/1999 |

(Continued)

OTHER PUBLICATIONS

Finnish Search Report issued in corresponding Patent Application No. 20195493 dated Sep. 23, 2019.

(Continued)

*Primary Examiner* — Nina Bhat
(74) *Attorney, Agent, or Firm* — Buchanan Ingersoll & Rooney PC

(57) ABSTRACT

The present disclosure relates to methods for processing plastic waste pyrolysis gas, such as methods wherein clogging of the systems used in the method is avoided or at least alleviated.

18 Claims, 1 Drawing Sheet

(56) References Cited

U.S. PATENT DOCUMENTS

| | | | |
|---|---|---|---|
| 5,092,981 A * | 3/1992 | Russo | C10G 9/002 |
| | | | 208/132 |
| 5,324,486 A | 6/1994 | Russo | |
| 5,607,487 A | 3/1997 | Taylor | |
| 5,917,138 A | 6/1999 | Taylor | |
| 5,922,092 A | 7/1999 | Taylor | |
| 7,905,990 B2 | 3/2011 | Freel | |
| 8,961,743 B2 | 2/2015 | Freel | |
| 9,045,695 B2 * | 6/2015 | Brentnall | F28F 19/008 |
| 9,631,145 B2 | 4/2017 | Freel | |
| 10,294,433 B2 | 5/2019 | Grainger et al. | |
| 10,544,368 B2 | 1/2020 | Freel | |
| 11,142,722 B2 * | 10/2021 | Malm | C11B 3/00 |
| 2003/0047437 A1 | 3/2003 | Stankevitch | |
| 2009/0139851 A1 | 6/2009 | Freel | |
| 2010/0282587 A1 | 11/2010 | Brentnall et al. | |
| 2011/0083953 A1 * | 4/2011 | Horn | C10B 49/04 |
| | | | 201/25 |
| 2011/0123407 A1 | 5/2011 | Freel | |
| 2015/0191656 A1 | 7/2015 | Freel | |
| 2016/0369191 A1 * | 12/2016 | Ward | C10G 69/00 |
| 2018/0030356 A1 | 2/2018 | Freel | |
| 2018/0100108 A1 | 4/2018 | Grainger et al. | |
| 2019/0161683 A1 * | 5/2019 | Narayanaswamy | C10G 69/14 |
| 2019/0177626 A1 * | 6/2019 | Ramamurthy | C10G 69/06 |
| 2019/0275486 A1 * | 9/2019 | Peltekis | C08J 11/04 |
| 2020/0190406 A1 | 6/2020 | Freel | |

FOREIGN PATENT DOCUMENTS

| | | | |
|---|---|---|---|
| CN | 205832665 U | 12/2016 | |
| CN | 109603376 A | 4/2019 | |
| EP | 0025100 A1 | 3/1981 | |
| EP | 3031881 A1 * | 6/2016 | ............ C10B 53/07 |
| EP | 3031881 A1 | 6/2016 | |
| JP | S4952172 A | 5/1974 | |
| JP | 07-216363 A | 8/1995 | |
| JP | 2000-212574 A | 8/2000 | |
| JP | 2005134079 A | 5/2005 | |
| JP | 2006321851 A | 11/2006 | |
| JP | 2016060800 A | 4/2016 | |
| WO | 2014145212 A2 | 9/2014 | |
| WO | WO-2016077695 A1 * | 5/2016 | ........... B01D 5/0081 |

OTHER PUBLICATIONS

International Preliminary Report on Patentability (PCT/IPEA/409) dated Apr. 28, 2021, by the Finnish Patent Office for International Application No. PCT/FI2020/050370.

International Search Report (PCT/ISA/210) and Written Opinion (PCT/ISA/237) dated Sep. 23, 2020, by the Finnish Patent Office as the International Searching Authority for International Application No. PCT/FI2020/050370.

International Search Report (PCT/ISA/210) and Written Opinion (PCT/ISA/237) dated Aug. 31, 2020, by the Finnish Patent Office as the International Searching Authority for International Application No. PCT/FI2020/050369.

Williams et al., "Analysis of products from the pyrolysis and liquefaction of single plastics and waste plastic mixtures", Resources, Conservation and Recycling, 51, 2007, pp. 754-769.

Williams et al., "Interaction of Plastics in Mixed-Plastic Pyrolysis, Energy & Fuels", vol. 13, No. 1, 1999, pp. 188-196.

Search Report dated Feb. 24, 2022 by the Chinese Patent Office for Application No. 2020800400510 (2 pages).

Search Report dated Mar. 1, 2022 by the Chinese Patent Office for Application No. 2020800398953 (2 pages).

Supplementary Search Report dated Apr. 5, 2022 by the European Patent Office for Application No. 20822580 (2 pages).

Supplementary Search Report dated Apr. 8, 2022 by the European Patent Office for Application No. 20822331 (2 pages).

* cited by examiner

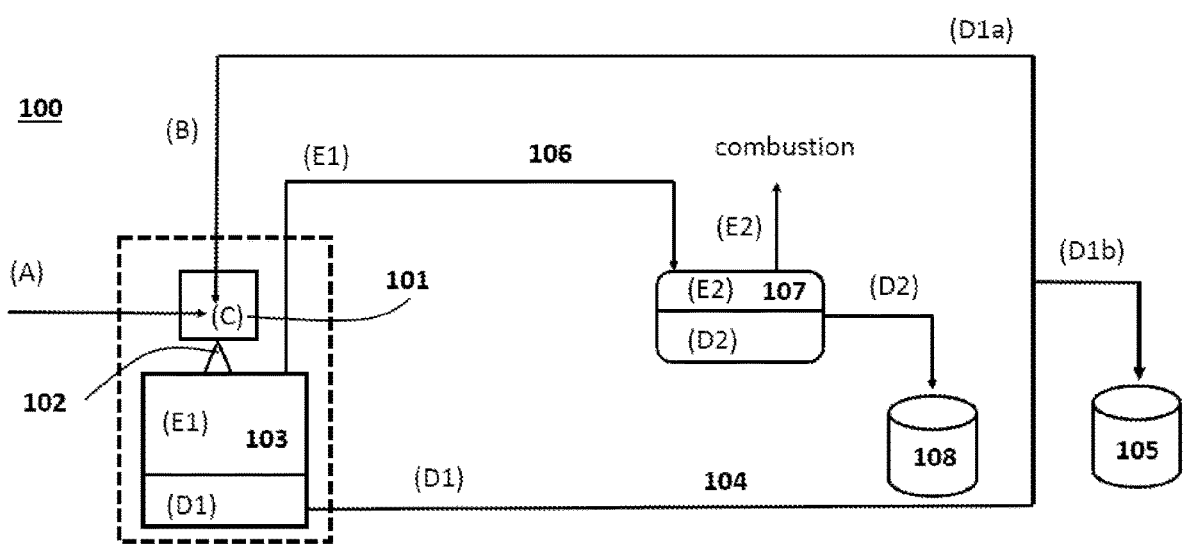

METHOD FOR PROCESSING PLASTIC WASTE PYROLYSIS GAS

FIELD

The present invention relates to methods for processing plastic waste pyrolysis gas, in particular methods wherein clogging of the systems used in the method is avoided.

BACKGROUND

Significant amount of waste plastic is produced around the world. For example municipal solid plastic waste comprises typically high-density polyethylene (HDPE), low-density polyethylene (LDPE), polypropylene (PP), polystyrene (PS), poly(vinyl chloride) (PVC), and poly(ethylene terephthalate) (PET). This is an abundant feedstock which could be utilized as an alternative refinery feed and a platform to new plastics and chemicals. However, solid plastic is not suitable feedstock as such, but it needs to be liquefied first. Yield and composition of the products are mainly influenced by plastic type and process conditions (Williams et al. Energy & Fuels, 1999, 13, 188-196).

Processing of waste plastic is carried out in chemical recycling systems, and it relies on thermal, pyrolytic reactions to crack the long plastic polymers to shorter products, most of which are liquids. The gaseous product mixture from plastic pyrolysis is known to clog and foul surfaces, pipes and equipment. Partly this is because some of the reaction products are heavy, waxy components which deposit on surfaces, but also tar, char and more solid, coke type deposits are common. The waxy components and tar are especially problematic on cooling surfaces of heat exchangers used in condensing the reaction mixture, but coke can deposit anywhere in the equipment. These cause two main problems. Firstly, the deposits act as an insulator reducing the heat transfer in the heat exchangers. Secondly, the deposits will eventually clog the heat exchanger, preventing any flow through it. Therefore, if traditional heat exchangers are used to condense the pyrolysis gas, then the equipment needs to be duplicated: while one is in operation, the other is under maintenance and cleaning. This is expensive and labor intensive.

This problem has been solved before using direct contact condensers. However, spray condensers, for example, suffer from relatively low separation efficiency, and they offer no protection against coke deposits. Also, the liquid recycling used in these condensers necessitates a liquid holdup which has two main drawbacks. Firstly, it significantly increases the fire load of the apparatus as there is a reservoir of hot pyrolysis product mixture in the recycle loop. Secondly, the relatively long residence time of this liquid reservoir exposes the liquid to additional thermal reactions, potentially reducing the product quality and causing fouling of the equipment.

EP3031881A1 discloses a method for processing waste plastic pyrolysis gas. The method comprises pre-purification of the waste pyrolysis gas by passing it to a collection chamber for removal of carbonizates followed by passing through a cyclone for removal of larger particles of solid impurities. The pre-purified waste plastic pyrolysis gas is then purified from remaining particles and heavy oil fractions by sprinkling the pre-purified gas at temperature of about 400-500° C. by oil having temperature about 70-110° C. The sprinkling is performed e.g. by using a Venturi scrubber.

US2003047437A1 discloses a process for pyrolysis of waste plastics to produce hydrocarbon oils. The process comprises pyrolyzing of waste plastics to form hydrocarbon oils, gravitational separating the gaseous pyrolysis products, quenching the separated gaseous pyrolysis products by preliminarily cooled liquid pyrolysis products, and delivering the formed mixture into a fractionating column for subsequent cooling and fractionation of gaseous and liquid fractions.

JPS4952172A discloses a method for processing polymer waste such as PVC pyrolysis gas. The method comprises feeding synthetic polymer into a furnace, spraying the waste oil into a scrubber tower so that the oil exchanges heat with the gaseous products from the furnace separated into volatile and liquid components. The gaseous products from the liquid-gas separation tower are led into another separation tower and recovered as gaseous and liquid hydrocarbons.

CN109603376A discloses a system for processing plastic waste pyrolysis gas.

Accordingly, there is still need for further methods for processing plastic waste pyrolysis gas wherein risk of clogging of the system used in the process is reduced.

SUMMARY

The following presents a simplified summary in order to provide a basic understanding of some aspects of various embodiments of the invention. The summary is not an extensive overview of the invention. It is neither intended to identify key nor critical elements of the invention, nor to delineate the scope of the invention. The following summary merely presents some concepts of the invention in a simplified form as a prelude to a more detailed description of exemplifying embodiments of the invention.

It was observed that when gaseous reaction mixture from plastic waste pyrolysis was admixed with cooled, condensed pyrolysis product, the highest boiling part of the pyrolysis gases condense smoothly from the admixture without clogging.

It was also observed that clogging of the plastic waste pyrolysis products could be avoided by passing the gaseous pyrolysis product to a condensing means operating at lower temperature than the pyrolysis temperature, when any solidifying materials is wiped and/or scraped from inner walls of the condensing means.

In accordance with the invention, there is provided a new method for processing plastic waste pyrolysis gas, the method comprising
  a) providing
    a plastic waste pyrolysis gas stream wherein temperature of the plastic waste pyrolysis gas stream is 300-650° C., preferably 450-500° C. and
    a hydrocarbonaceous liquid stream wherein temperature of the hydrocarbonaceous liquid stream is below temperature of the plastic waste pyrolysis gas stream,
  b) admixing in an ejecting means, the plastic pyrolysis gas stream and the hydrocarbonaceous liquid stream to form an admixture,
  c) ejecting through a spray nozzle, the admixture to a chamber to produce a condensed fraction and a gaseous fraction, and
  d) separating the gaseous fraction and the condensed fraction to yield a first liquid product stream and a gaseous product stream.

A number of exemplifying and non-limiting embodiments of the invention are described in accompanied dependent claims.

Various exemplifying and non-limiting embodiments of the invention and to methods of operation, together with additional objects and advantages thereof, are best understood from the following description of specific exemplifying embodiments when read in connection with the accompanying figures.

The verbs "to comprise" and "to include" are used in this document as open limitations that neither exclude nor require the existence of also unrecited features. The features recited in depending claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The exemplifying and non-limiting embodiments of the invention and their advantages are explained in greater detail below with reference to the accompanying FIGURE, in which FIG. 1 show an exemplary non-limiting system suitable for processing plastic waste pyrolysis gas according to an embodiment of the present invention.

DESCRIPTION

The present invention is related to processing plastic waste pyrolysis gas such that clogging of a system used in the method is avoided or at least alleviated.

FIG. 1 shows an exemplary system 100 suitable for use in a method according to an embodiment of the present invention. According to this embodiment the method comprises co-introducing plastic waste pyrolysis gas stream (A) and hydrocarbonaceous liquid stream (B) to an ejecting means 101 to form an admixture (C). Temperature of the plastic waste pyrolysis gas stream is typically 300-650° C., preferably 450-500° C. Temperature of the hydrocarbonaceous liquid stream is below temperature of the plastic waste pyrolysis gas stream, typically 100-300° C., preferably 175-225° C. An exemplary temperature of the hydrocarbonaceous liquid stream is 200° C. The proper admixing will ensure a thorough contact between the two phases and cooling of the reaction gases so that the highest boiling part of the reaction gases condense.

After mixing, the admixture is directed, preferably through a spray nozzle 102 to a chamber 103 wherein liquids and gases separate, and a condensed, liquid fraction (D1) and a gaseous fraction (E1) are formed. The chamber comprises outlets for gases and liquids.

Accordingly, as the gaseous pyrolysis reaction mixture is mixed thoroughly with the cooler hydrocarbonaceous liquid before it enters the chamber, a good contact between the liquid phase and the gaseous phase is achieved. This results in improved, more ideal condensing behavior and more ideal separation. Also, since the admixing is carried out in an ejecting means though a nozzle, the flow rate is high enough to keep the ejecting means free from fouling, while still possessing the same advantages as other direct contact condensers. An exemplary device comprising ejecting means, nozzle and a chamber is an ejector venturi scrubber.

Mass ratio of the liquid and gas in the admixture should be high enough to avoid too strong cooling. The mass ratio is typically 1-100, preferably 5-25. An exemplary mass ratio is 12.

When the admixture ejected through the nozzle to the chamber, a liquid phase and a gaseous phase is formed, and the liquid fraction and the gaseous fraction are separated to yield the first liquid product stream (D1) and a gaseous product stream (E1).

According to a preferable embodiment a first part (D1a) of the first liquid product stream is recirculated, e.g. pumped back from chamber 103 to the ejecting means 101 via a line 104, and a second part (D1b) of the first liquid product stream is taken out from the process to a collecting means 105 as a "heavy product". Yield and composition of the heavy product is mainly dependent on the nature of the waste plastic, the pyrolysis conditions and the condensing temperature.

In order to avoid blockages, the line 104 and thus also the first part of the first liquid products stream therein is preferably kept at temperatures above 100° C. more preferably between 150° C. and 250° C. The desired temperature range can be obtained by insulating the line and/or using one or more heating means. An exemplary temperature of the first part of the first liquid product stream is 200° C.

According to a preferable embodiment the gaseous fraction, i.e. the gaseous product stream (E1) is directed from the chamber 103 via a line 106 to a condensing means 107. The condensing means is typically a traditional heat exchanger. According to an exemplary embodiment, temperature of the gaseous product stream is decreased in the condensing means 107 to 10-50° C., preferably to 20-40° C. The cooling produces condensed liquid and non-condensable gases. No fouling or clogging is expected within the line 106 and in the condensing means 107 as the majority of the heavy components have been removed. The condensed liquid (D2) is separated from the non-condensable gases (E2) to yield a second liquid product stream, i.e. a light product. It can be transferred to a collecting means such as a tank 108. Yield and composition of the light product is dependent on the nature of the waste plastic, the pyrolysis conditions and the condensation temperatures. The non-condensable gases may be directed to combustion or to one or more further collecting means.

According to the embodiment shown in FIG. 1, the method comprises co-introducing plastic waste pyrolysis gas stream and a hydrocarbonaceous liquid stream to an ejecting means. In order to initiate the process, the system is filled with a seed liquid. The seed liquid is typically condensed plastic waste pyrolysis gas from an earlier process. Alternatively, another hydrocarbonaceous liquid composition with similar properties can be used. The aim is to verify that the system includes enough hydrocarbonaceous liquid material to be admixed with the plastic waste pyrolysis gas stream in the ejecting means in the beginning of the process.

EXPERIMENTAL

The process was simulated with Aspen plus software. The pyrolysis gas was modelled using pseudo components, which were estimated using experimentally measured distillation curve and density from crude plastics pyrolysis oil. The used density was 809.8 kg/m$^3$, and true boiling point (TBP) distillation curve is presented in table 1.

TABLE 1

| recovered mass (%) | temperature (C. °) |
|---|---|
| 2 | 36.0 |
| 5 | 68.6 |
| 10 | 97.4 |
| 30 | 171.9 |
| 50 | 236.0 |
| 70 | 316.0 |
| 90 | 430.4 |
| 95 | 474.3 |
| 100 | 582.4 |

Additionally, the amount and composition of light ends were estimated from literature (Williams et al., Energy & Fuels, 1999, 13, 188-196; Williams et al., Resources, Conservation and Recycling, 2007, 51, 754-769). Mass ratio of lights and pseudo components was 0.27, and the composition of the lights is presented in table 2.

TABLE 2

| Light product | wt-% |
|---|---|
| methane | 36.3 |
| ethene | 2.2 |
| ethane | 28.9 |
| propene | 4.7 |
| propane | 19.9 |
| butene | 1.5 |
| butane | 6.7 |

The thermodynamic model used in the simulations was Braun K-10, and it was assumed that there was one ideal separation stage in the ejecting means.

Stream of plastic waste pyrolysis gas, having a pressure of 95 kPa(a), a temperature of 500° C., an average mol weight 69.2 g/mol and a mass flow of 20 kg/h exited the reactor.

The pyrolysis gas is allowed to enter a venturi ejector, where it is contacted with recirculated hydrocarbonaceous liquid stream. Mass ratio of the hydrocarbonaceous liquid and the plastic waste pyrolysis gas was approximately 100. The venturi ejector sprays the admixture into a separation chamber, and the condensed heavy hydrocarbons were pumped through a tube-and-shell heat exchanger. This heat exchanger is adjusted so that the temperature of the resulting admixture was from 100 to 300° C. After the heat exchanger the liquid heavy hydrocarbons were split and partly recirculated back to venturi ejector and partly bled out and collected.

The non-condensed gases exited the separation tank through a demister and were directed to a heat exchanger. The output temperature of the process side of this heat exchanger was 40° C. Condensed light hydrocarbons and non-condensables were fed to a separation tank, from where non-condensables were fanned out and directed to incineration, and the liquid was collected. The results from three simulation cases are presented in the tables 3-5.

TABLE 3

| Admixture temperature (° C.) | Product flows (wt-% of pyrolysis gas) | | |
|---|---|---|---|
| | heavy product | light product | Uncondensables |
| 150 | 41.6 | 25.6 | 32.8 |
| 200 | 26.9 | 41.6 | 31.5 |
| 250 | 13.8 | 55.3 | 30.9 |

TABLE 4

| Admixture temperature (° C.) | TBP distillation curve (° C.) | | | |
|---|---|---|---|---|
| | Heavy product | | Light product | |
| | 5 wt-% | 95 wt-% | 5 wt-% | 95 wt-% |
| 150 | 184.6 | 508.0 | 83.0 | 260.5 |
| 200 | 233.8 | 534.5 | 89.5 | 313.9 |
| 250 | 300.1 | 558.1 | 97.2 | 377.6 |

TABLE 5

| Admixture temperature (° C.) | Average molar weight of gas (g/mol) | | |
|---|---|---|---|
| | Pyrolysis gases | Between condensers | Uncondensables |
| 150 | 69.2 | 45.4 | 29.8 |
| 200 | 69.2 | 53.9 | 29.0 |
| 250 | 69.2 | 61.1 | 28.6 |

The specific examples provided in the description given above should not be construed as limiting the scope and/or the applicability of the appended claims.

What is claimed is:

1. A method for processing plastic waste pyrolysis gas, the method comprising:
   a) providing:
      a plastic waste pyrolysis gas stream wherein a temperature of the plastic waste pyrolysis gas stream is 300-650° C.; and
      a hydrocarbonaceous liquid stream wherein a temperature of the hydrocarbonaceous liquid stream is below temperature of the plastic waste pyrolysis gas stream;
   b) admixing in an ejecting means the plastic waste pyrolysis gas stream and the hydrocarbonaceous liquid stream to form an admixture;
   c) spraying the admixture to a separation chamber to produce a condensed fraction and a gaseous fraction; and
   d) separating the gaseous fraction and the condensed fraction to yield a first liquid product stream and a gaseous product stream.

2. The method according to claim 1, wherein a temperature of the hydrocarbonaceous liquid stream of step a) is 100-300° C.

3. The method according to claim 1, wherein a mass ratio of the hydrocarbonaceous liquid stream and the plastic waste pyrolysis gas stream in the admixture is 1-100.

4. The method according to claim 1, comprising:
   recycling a first part of first liquid product stream to the hydrocarbonaceous liquid stream of step a) and collecting a second part of the first liquid product stream.

5. The method according to claim 4, wherein a temperature of the first part of first liquid product stream is above 100° C.

6. The method according to claim 4, wherein the hydrocarbonaceous liquid stream of step a) contains the first part of first liquid product stream.

7. The method according to claim 1, comprising:
   cooling the gaseous product stream of step d) to 10-50° C. to yield a second liquid product stream and a gaseous stream.

8. The method according to claim 7, comprising:
   separating the second liquid product stream and the gaseous stream.

9. The method according to claim 1, comprising:
providing:
a plastic waste pyrolysis gas stream wherein a temperature of the plastic waste pyrolysis gas stream is 450-500° C.

10. The method according to claim 9, wherein a temperature of the hydrocarbonaceous liquid stream of step a) is 175-225° C.

11. The method according to claim 10, wherein a mass ratio of the hydrocarbonaceous liquid stream and the plastic waste pyrolysis gas stream in the admixture is 5-25.

12. The method according to claim 11, wherein a temperature of the first part of first liquid product stream is between 150-250° C.

13. The method according to claim 12, comprising:
cooling the gaseous product stream of step d) to 20-40° C. to yield the second liquid product stream and the gaseous stream.

14. The method according to claim 2 wherein a mass ratio of the hydrocarbonaceous liquid stream and the plastic waste pyrolysis gas stream in the admixture is 1-100.

15. The method according to claim 14, comprising:
recycling a first part of first liquid product stream to the hydrocarbonaceous liquid stream of step a) and collecting a second part of the first liquid product stream.

16. The method according to claim 15, wherein the hydrocarbonaceous liquid stream of step a) contains the first part of first liquid product stream.

17. The method according to claim 16, comprising:
cooling the gaseous product stream of step d) to 10-50° C. to yield the second liquid product stream and the gaseous stream.

18. The method according to claim 17, comprising:
separating the second liquid product stream and the gaseous stream.

* * * * *